(12) United States Patent
Cassiday et al.

(10) Patent No.: US 7,042,837 B1
(45) Date of Patent: May 9, 2006

(54) AUTOMATIC LINK FAILOVER IN DATA NETWORKS

(75) Inventors: Daniel R. Cassiday, Topsfield, MA (US); David L. Satterfield, Tewksbury, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 921 days.

(21) Appl. No.: 09/697,663

(22) Filed: Oct. 25, 2000

(51) Int. Cl.
*H04L 12/26* (2006.01)

(52) U.S. Cl. ...................................... 370/225; 370/244
(58) Field of Classification Search ................ 370/237, 370/238, 225, 226, 227, 228, 241, 242, 244, 370/239; 709/239, 241
See application file for complete search history.

(56) References Cited

U.S. PATENT DOCUMENTS

| | | | | |
|---|---|---|---|---|
| 5,084,867 A * | 1/1992 | Tachibana et al. | ........... | 370/398 |
| 5,398,236 A * | 3/1995 | Hemmady et al. | ........... | 370/218 |
| 5,436,886 A | 7/1995 | McGill | ............ | 370/16 |
| 5,488,606 A | 1/1996 | Kakuma et al. | ............ | 370/16 |
| 5,517,495 A | 5/1996 | Lund et al. | ............ | 370/60 |
| 5,600,630 A * | 2/1997 | Takano et al. | ............ | 370/218 |
| 5,675,736 A * | 10/1997 | Brady et al. | ............ | 709/239 |
| 5,802,258 A | 9/1998 | Chen | ............ | 714/10 |
| 5,841,989 A * | 11/1998 | James et al. | ............ | 709/239 |
| 5,903,545 A * | 5/1999 | Sabourin et al. | ............ | 370/225 |
| 5,905,714 A * | 5/1999 | Havansi | ............ | 370/242 |
| 5,926,456 A * | 7/1999 | Takano et al. | ............ | 370/218 |
| 5,982,771 A | 11/1999 | Caldara et al. | ............ | 370/389 |
| 6,069,893 A | 5/2000 | Parruck et al. | ............ | 370/395 |
| 6,101,166 A * | 8/2000 | Baldwin et al. | ............ | 370/222 |
| 6,154,444 A * | 11/2000 | Masuo et al. | ............ | 370/225 |
| 6,188,668 B1 * | 2/2001 | Brewer et al. | ............ | 370/222 |
| 6,201,787 B1 * | 3/2001 | Baldwin et al. | ............ | 370/222 |
| 6,205,117 B1 * | 3/2001 | Doshi et al. | ............ | 370/228 |
| 6,233,073 B1 * | 5/2001 | Bowers et al. | ............ | 398/16 |
| 6,343,067 B1 * | 1/2002 | Drottar et al. | ............ | 370/231 |
| 6,411,600 B1 * | 6/2002 | Kwak et al. | ............ | 370/225 |
| 6,452,934 B1 * | 9/2002 | Nakata | ............ | 370/428 |
| 6,658,052 B1 * | 12/2003 | Krinsky et al. | ............ | 375/222 |
| 6,658,478 B1 * | 12/2003 | Singhal et al. | ............ | 709/232 |
| 6,865,149 B1 * | 3/2005 | Kalman et al. | ............ | 370/225 |
| 2002/0067693 A1 * | 6/2002 | Kodialam et al. | ............ | 370/216 |

* cited by examiner (Continued)

*Primary Examiner*—Chi Pham
*Assistant Examiner*—Blanche Wong
(74) *Attorney, Agent, or Firm*—Meyertons Hood Kivlin Kowert & Goetzel, P.C.; B. Noël Kivlin

(57) ABSTRACT

Methods and apparatus are disclosed for enabling nodes in a data network having interconnect links to continue to transmit data when a link fails. This is done in realtime, in a manner transparent to upper-level clients, and at a hardware level without software intervention. A method is described in which a data packet is received or stored in a transmitter buffer at an originating node having a failed link where the data packet is scheduled to use the failed link. The data packet is routed to a failover storage area. The failover storage area is a shared resource in the node and consists of two first-in, first-out stacks for processing and routing the failover data packets. If needed, an alternative link is selected for the data packet and the data packet is routed to a transmitter associated with the alternative link. An alternative link is selected using a primary and secondary routing table, also part of the shared resource of the node. The data packet is then transmitted to a receiver for the alternative link at a destination or multihop node. This allows the data packet to reach the remote end of a failed link by sharing alternate links connecting the local and remote ends of a failed link.

22 Claims, 9 Drawing Sheets

AUTOMATIC LINK FAILOVER IN DATA NETWORKS

CROSS-REFERENCE TO RELATED APPLICATIONS

The present application is related to U.S. patent application Ser. No. 09/697,730, filed on Oct. 25, 2000, entitled, "HIGH PERFORMANCE TRANSMISSION LINK AND INTERCONNECT", which is incorporated herein by reference.

BACKGROUND OF THE INVENTION

1. Field of the Invention

The present invention relates generally to data communication networks and the transmission of data in those networks and the transmission of data in the networks. More specifically, it relates to hardware modifications for ensuring the reliable and accurate transmission of data across interconnect links between nodes in the data communication network when an interconnect link fails.

2. Discussion of Related Art

As the use of data communication networks becomes increasingly widespread, the need for reliable data transmission through nodes in such networks, the Internet being one example, has become more important. In addition, the standards for what is acceptable data transmission and what actions should be taken when there is a failure in a network link have also been rising. In some network protocols, the tolerance for transmission errors is decreasing and it is required that any disruptions in nodes in the network be transparent to the high-level clients and other nodes. Data should reach destination nodes without errors and in order. Any failures and resulting failover actions taken by the network should be transparent to upper-level clients.

Presently, the interconnect links in most data networks are not sufficiently reliable to ensure that data reach destinations without errors and in proper order, and that failover actions be transparent to other nodes and users. One reason for this is that many failover schemes are implemented primarily at a software level. That is, processes implemented in software detect a problem or failure and send the data using an alternative route. These software solutions fall short of the requirements for complete, error-free, fast, and in-order data transmission. In addition, protocols such as SSM (scalable, shared memory), require that data packets be delivered to their destinations despite link failures and that the state of the network be recoverable. Presently, there are no hardware or software solutions that meet these requirements.

Therefore, it would be desirable to have a hardware solution that works at a lower-level without software intervention and that is transparent to upper-level clients. Data packets should be dynamically re-routed on an alternative path without affecting any clients in the network and should be done in as close to realtime as possible. In addition, it would be desirable to use underlying link retransmission protocols (used to handle occasional link errors) to implement a failover scheme that is tolerant of lost packets. This allows for the implementation of a link failover scheme to be built on top of the link retransmission protocol.

SUMMARY OF THE INVENTION

According to the present invention, methods and apparatus are disclosed for enabling the continued, realtime, transmission of data packets in a data network when a link in the network has failed. In one aspect of the present invention, a failover-enabled node in a data network is described. A node contains a modified receiver having a failover buffer for storing and routing a failover data packet. The node also contains a first-in, first-out (FIFO) data storage area for storing a failover data packet and routing the data packet to a receiver or transmitter. The node also contains a routing table having at least two rows. A row in the routing table corresponds to a neighboring node and at least one interconnect link for transmitting data to that node. These components enable the node to continue with the flow of a data packet to a destination node without disruption when an interconnect link along the path to that node fails.

In one embodiment, the FIFO data storage area contains a first FIFO data stack that outputs data to a transmitter and accepts data from a receiver and a transmitter, and a second FIFO that outputs data to a transmitter and a receiver and accepts data from a receiver. In another embodiment the routing table has a column for storing a node identifier and another column for storing a transmitter identifier corresponding to a link. In yet another embodiment the node contains a multiplexer for determining whether a normal data packet or a failover data packet will be transmitted on a link.

In another aspect of the present invention, a method of transmitting data over a network having multiple nodes and links when a link has failed is described. A data packet is received at a first node having a failed link where the data packet is scheduled to use the failed link. Data goes into the transmission buffer of the failed link upon exiting the transmit buffer. It is converted and sent to a failover storage area. The link is chosen when the packet is pushed to the failover storage area. The data packet is routed to a failover storage area. When the packet is pushed to the failover storage area, an alternate link is selected for the data packet and the data packet is routed to a transmitter associated with the alternative link. The data packet is then transmitted to a receiver for the alternative link at a destination or multihop node. This allows the data packet to reach an intended destination by modifying the first node at a hardware level and without any software intervention.

In one embodiment, the data packet is converted to a failover packet at the first node by changing a packet type and destination node. In another embodiment, the node examines one or more failover route tables using a destination node identifier and retrieves an alternative link. The first table searched is a primary routing table to retrieve a primary link. If the primary link is a failed link or an incoming link, a secondary route table is queried to retrieve an alternative link. In yet another embodiment, the data packet is stored in a failover buffer when received at the first node and before the packet is routed to a failover storage area, where the packet is temporarily stored in one of two data stacks. In another embodiment, the data packet is sent out by the selected transmitter without storing the packet in the transmitter's buffer, thus only sharing the alternative physical link of the node.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A system and method for automatic link failover in data networks are described in the various figures. Automatic link failover enables data packet traffic scheduled to go over a particular link to be dynamically re-routed to an alternative path if the particular link should fail. The present invention describes components and methods in which no data packets will be lost or delivered out of order and in which traffic delays do not exceed agent time-out limits. Automatic link failover of the present invention can be used to reduce system failure rates from single optical link failures and allow for uninterrupted operation when a link fails.

As will be described in greater detail below, when link failover is enabled and the transmission error rate on a link becomes excessive, the link goes into failover mode according to the present invention. The link is shut down and any data packets scheduled to use the link is redirected to a failover path for that link. There is a failover path defined for each potential link failure. This failover path has a certain number of "hops." Failover path routing is similar to normal packet routing except separate failover route tables are used to determine the failover path. Failover packets (FOPs) only share links with normal packet traffic as FOPs multihop along a failover path. These failover packets can be seen as using a separate virtual channel. That is, except for a shared link, they do not share any other hardware resources with normal packet traffic. In addition, when a link goes into failover mode, the failover relies on a retransmission protocol that already exists. This guarantees that the packet stream will continue to be delivered reliably in spite of a link failure.

Figure 1:
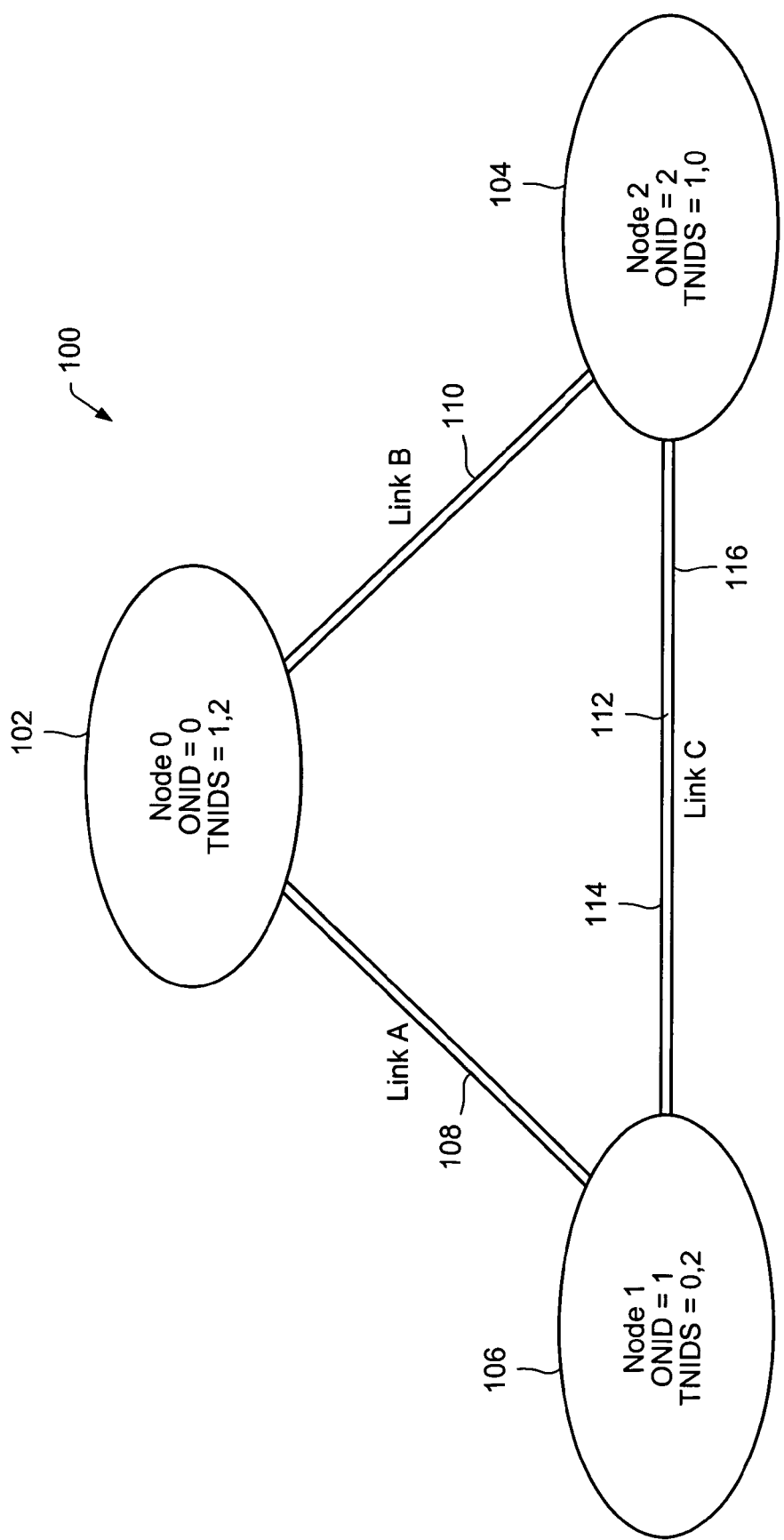
FIG. 1 is a logical block diagram of a data network having three nodes and three links used to illustrate one embodiment of the present invention.

FIG. 1 is a logical block diagram of a data network having three nodes and three links used to illustrate one embodiment of the present invention. Network 100 has three nodes, node 102, node 104, and node 106, and three interconnect links, link 108, link 110, and link 112. For ease of reference, in the description below, these nodes and links will also be referred to as follows: node 102=Node 0, node 106=Node 1, node 104=Node 2, link 108=Link A, link 110=Link B, and link 112=Link C.

Each node is both an end-node (e.g., a server) and a switch. A node has an identifier referred to as an ONID. For example, the ONIDs for Nodes 0, 1, and 2 can be 0, 1, and 2, respectively. A link is a bidirectional path implemented using two unidirectional physical segments shown, for example, as lines 114 and 116 for Link C. The number of links each node can have depends on the limitations of the particular data network. A typical number of nodes that can be connected to a single node is fifteen. For each node connected to a particular node, there exists a TNID in the particular node. For example, in network 100, Node 1 has two TNIDs, 0 and 2, corresponding to Node 0 and Node 2. As is known to one skilled in the field of data networks, each interconnect or link in a node has a receiver and a transmitter. Thus, each node in network 100 has two receiver/transmitter pairs. Of course, network 100 is a simplified version of a typical network, which can have a higher number of nodes and interconnects. A node modified to handle realtime, automatic link failover of the present invention is described in greater detail in FIG. 2. It is useful to mention here that there are at least two paths that can be used to go from one node, or an originator node, to a destination node: a shorter, primary path (e.g., Link A between Nodes 0 and 1) and a longer, secondary path (e.g., Links B and C via Node 2).

Figure 2:
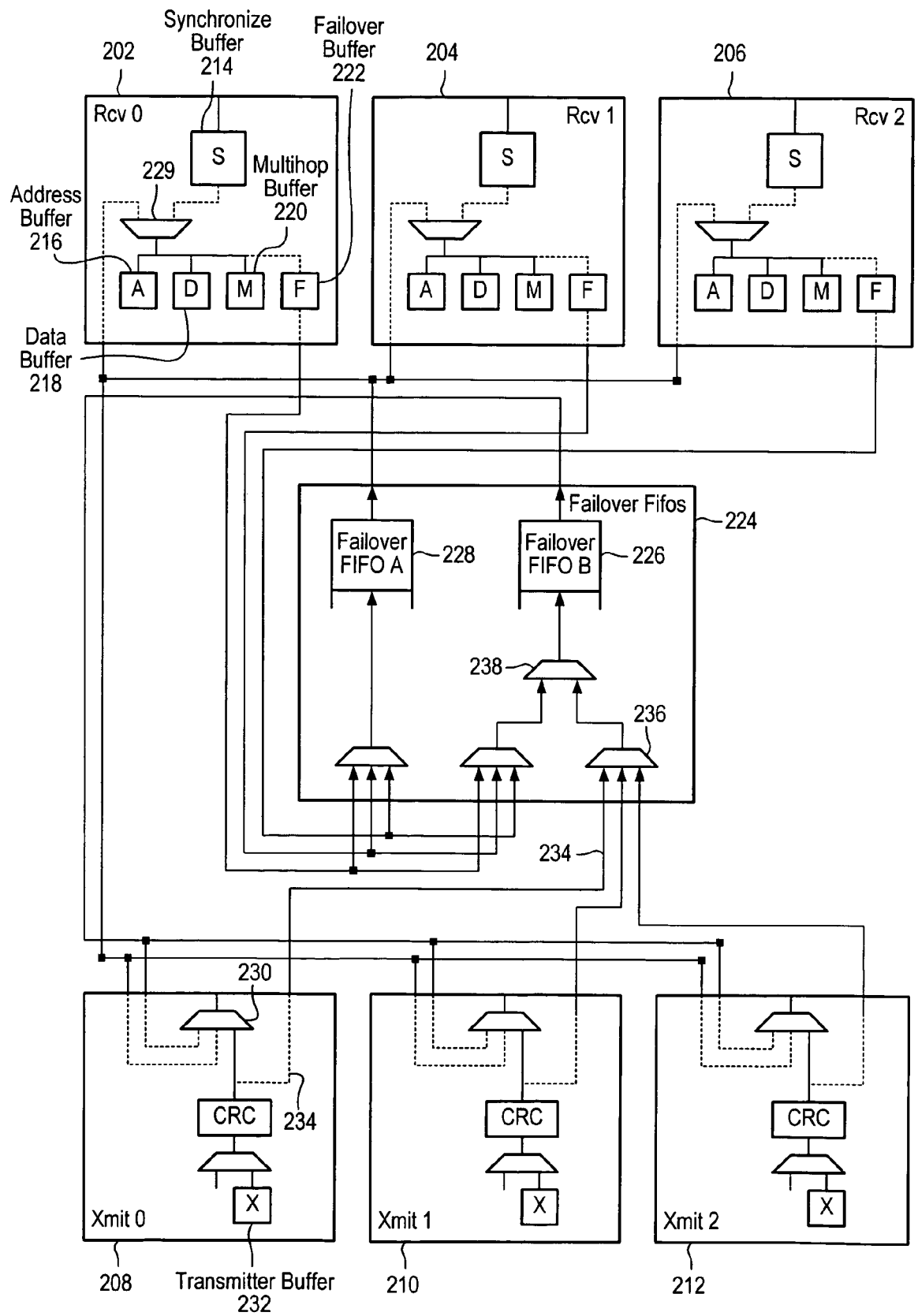
FIG. 2 is a schematic diagram showing components and logic enabling a node to process failover packets in accordance with one embodiment of the present invention.

FIG. 2 is a schematic diagram showing components and logic enabling a node to process failover packets in accordance with one embodiment of the present invention. It shows in greater detail any of Nodes 0, 1, and 2 with the one difference that the node of FIG. 2 has three links instead of two. The node components shown in FIG. 2 include three Rcv/Xmit pairs, i.e., three links (unlike the nodes shown in FIG. 1 which have two links). However, the concepts and components of the present invention are the same regardless of the number of links in each node (or the number of nodes in a network). Three receivers, 202 (Rcv 0), 204 (Rcv 1), and 206 (Rcv 2), and three transmitters, 208 (Xmit 0), 210 (Xmit 1), and 212 (Xmit 2) are shown. As is known in the field, each receiver has a synchronize buffer S, one of which is represented by box 214. Sync buffer S brings data to a local clock domain on the switch or node from the remote clock domain on the link from which a data packet is being received.

Under normal conditions, once a packet is received it can go to either an address buffer 216 (if an address packet), a data buffer 218 (if a data packet), or to a multihop buffer 220 (if the packet is hopping to another node via another link). Multihop buffer 220 feeds a cross-bar which sends the in-transit packet to a transmitter where it sits in a buffer before being sent out. In another preferred embodiment, these buffers can be combined in one buffer.

A fourth buffer referred to as a failover buffer 222 stores failover packets (FOPs) that get routed to a component of the node that can be referred to as a shared resource 224 in the node. In the described embodiment, shared resource 224 has two storage components: first-in, first-out (FIFO) stack A, 226, and FIFO stack B, 228. FIFO A gets packets from receivers and transmitters but feeds only transmitters. FIFO B gets packets from only receivers but feeds both receivers and transmitters. Another component of shared resource 224 is a pair of failover routing tables not shown in FIG. 2. Further details of failover buffer 222 and shared resource 224 are described below. Each receiver also contains a multiplexer 229 which receives packets from the sync buffer or from shared resource 224 and directs packets to one of the four buffers.

In each transmitter there is an arbitrator that works or instructs a mux, such as mux 230 in transmitter 208, whether the link for that transmitter will be used to transmit a normal packet or an FOP brought in via shared resource 224, originally from the buffer of a transmitter whose link has failed. That is, mux 230 and its associated selection control logic (the combination of these two components make up the arbitrator) is needed if the transmitter will be getting FOPs from another transmitter. Otherwise, if it was receiving only normal data packets it would not be needed. It is helpful to note here that in the described embodiment, a packet waiting in a transmitter buffer, such as in box 232 for a ling that fails is re-routed to another link but is not stored in the buffer for the transmitter for that alternative link. As will be described in greater detail below, a normal packet is modified be an FOP and only shares the interconnect link, but no other hardware resources of the alternative transmitter. Thus, a virtual channel is created for the FOP. The numerous connection paths and connectors in FIG. 2 are described in relation to the figures and flow diagrams below. Briefly, they show how data is routed among the failover buffers in the receivers, FIFOs A and B, and the transmitters.

Figure 3A:
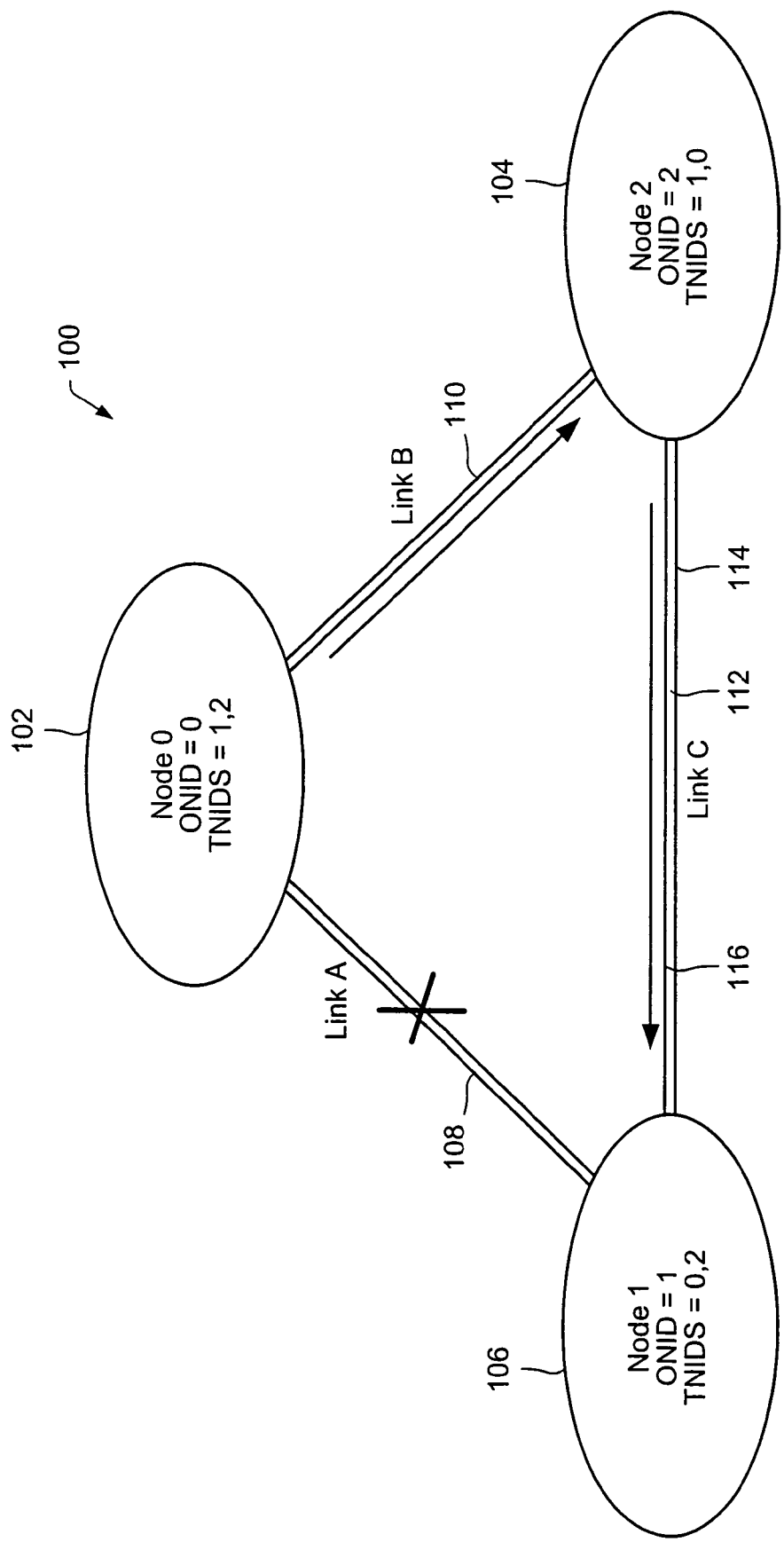
FIG. 3A is a logical block diagram of a data network showing a failed link and an alternative path for routing a failover data packet to a destination node in accordance with one embodiment of the present invention.

FIG. 3A is a logical block diagram of a data network showing a failed link and an alternative path for routing a failover data packet to a destination node in accordance with one embodiment of the present invention. It is similar to FIG. 1 except that it shows a failed link, Link A, between Node 0 and Node 1. It also shows an alternative path a failover data packet can take to get from Node 0 (origination node) to Node 1 (destination or target node) via Node 2 (a multihop node) using Links B and C. This figure illustrates an example used to describe one embodiment of a failover process shown in FIGS. 3B to 8 below.

Figure 3B:
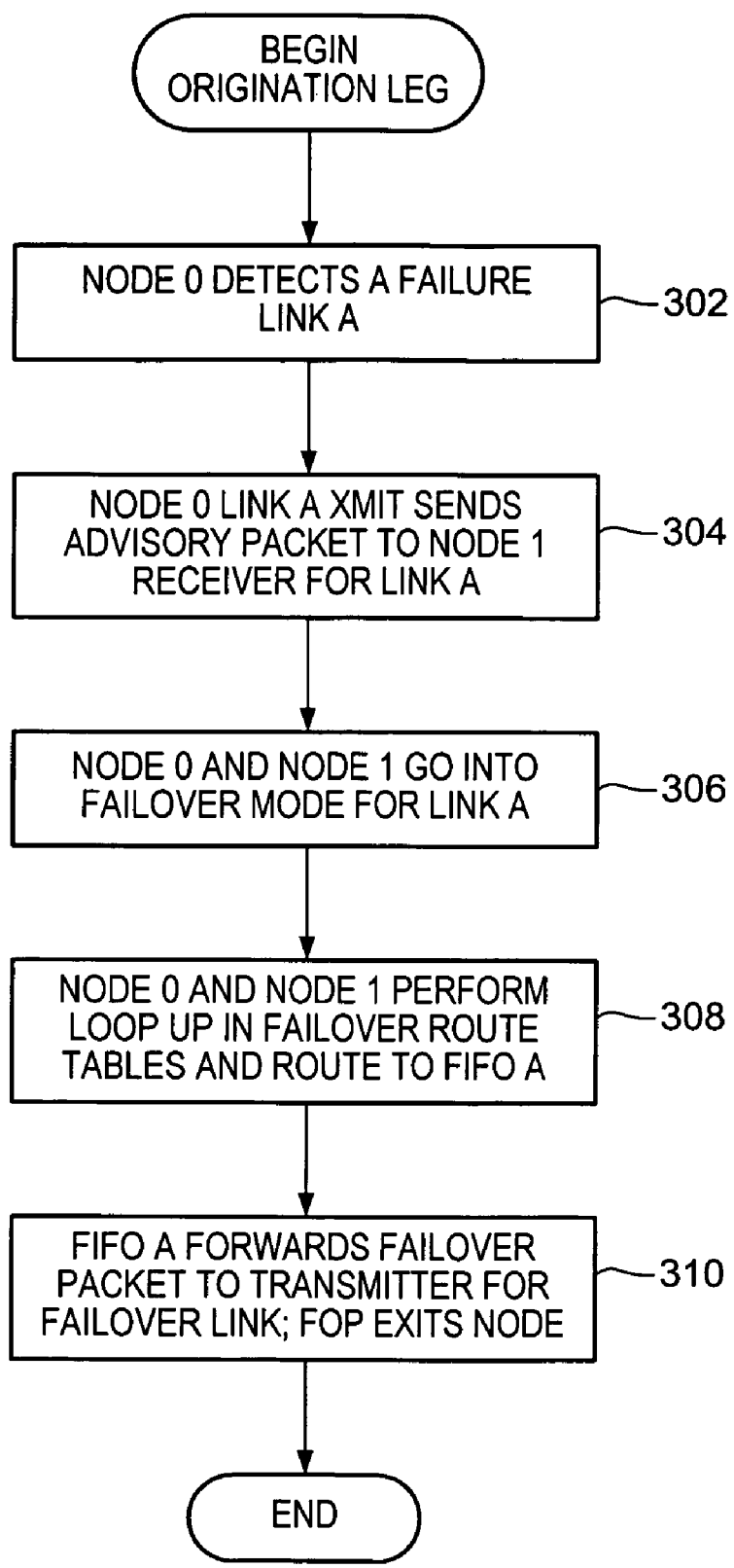
FIG. 3B is a flow diagram of an origination leg of an alternative path of a failover packet in a data network in accordance with one embodiment of the present invention.

FIG. 3B is a flow diagram of an origination leg of an alternative path of a failover packet in a data network in accordance with one embodiment of the present invention. The nodes and links referred to in this and subsequent flow diagrams are those shown in FIG. 1, i.e., Nodes 0, 1, and 2, and Links A, B, and C. For the purposes of illustrating the described embodiment, the following scenario will be used: Node 0 wants to send a normal data packet to Node 1 using Link A. As such, the data packet is presently in the transmitter for Link A in Node 0 scheduled to be sent to the receiver for Link A in Node 1 when a failure occurs in Link A.

At step 302 Node 0 detects a failure in Link A. As is known in the field, this can be done by examining the transmission error rate on a link and comparing it to a threshold number of errors. As mentioned above, a link is a bidirectional path implemented using two unidirectional physical segments. When one of the segments fails, both segments on the bidirectional link go into failover mode. One end (referred to as the near-end) experiences an excessive transmission error rate causing it to enter failover mode. In this example, the near-end is Node 0 and, specifically, the transmitter for Link A. The near-end will attempt to signal the far-end of this, using an administrative packet sent on an oppositely-directed link (i.e., the link that is connected to the transmitter associated with the receiver) before shutdown, where the administrative packet has an in_failover bit or an equivalent bit set. The far-end is the receiver for Link A in Node 1. This is shown at step 304. If the far-end receives this failover notification, it will also go into failover mode. The far-end receiver may not receive this advisory packet because the link may not be reliable (administration packets do not have retransmission features). If not, the ensuing transmission errors resulting from the near-end link shutdown (i.e., Node 0 turns off its clock) will cause the far-end to go into failover mode. More specifically, in certain networks, after sending sixteen administrative packets with an in failover bit set, the hardware in Node 0 will turn off the link clock on the failed segment. This process insures that an administrative packet will have been sent with an in_failover bit set on the failed link. If this packet is not received by the far-end, the far-end (i.e., Node 1) will enter failover mode due to clocking errors it detects as a result of the clock being turned off.

At step 306 Link A components for Node 0 and Node 1 go into failover mode. Failover mode is enabled by having a failover_en field set in the control status register for a particular link. Failover mode can only be entered when 1) the failover_en bit in the CSR is set on a given link, 2) that link is in an IN_USE state, and 3) the failover_en bit in a configuration register is set. This allows failover packets to be routed by links that are forwarding failover traffic. The link_state will go into FAILOVER when the conditions described in steps 302 and 304 occur.

At step 308 the normal data packet is converted to a failover data packet at the transmitter. Also performed at step 308 is a lookup in the failover route tables by the transmitter and an alternate link is selected. At this stage, the nodes insert into an outlink field in the data packets which alternative transmitter/link will be acting in place of the normal transmitter. Thus, a data packet at Node 0 scheduled to use Link A will have a value indicating the transmitter for Link A in its outlink field. As will be described below, a node uses its failover routing tables to determine which alternative link will be used and, thus, what replacement value will go in the outlink field. By doing so, the normal packet is converted to an FOP. This process is shown in greater detail below. Node 0 and Node 1 transmitters for Link A route data packets in its buffers to FIFO A. This is shown by connection line 234 for Xmit 208 shown in FIG. 2. Before entering FIFO A, the data packets go through mux 236 and mux 238 in shared resource 224.

In the described embodiment, failover is supported by having two additional fields in each packet. One field is for holding an ONID value which is a node identifier from which a failover packet is originating. The ONID value is used by a receiving node to verify that a failover packet arrived from an expected originating node. The receiver checks that the ONID in the packet matches a TNID value for that link. The other field is for holding a TNID value which is a node identifier for the far-end or receiving node of a link. This field is used to route failover packets to the far-end of the link when the link enters failover mode. In sum, when a link in a node enters failover mode, packet transmission for this link continues as before for both data and address packets except that these packets are sent to FIFO A logic. The status information (i.e., expected sequence number, etc.) that is normally sent out with a normal packet is included as well as the sequence number of the original packet. The packet is modified to mark it as a failover packet by setting a failover_pkt bit. The CRC is then calculated (based on the modified packet) and attached. The ONID is embedded into this CRC in the same manner as sequence numbers are embedded. This is used to uniquely mark the originator of the failover packet. As will be seen, the termination node will need this information in accepting the packet.

At step 310 FIFO A forwards the FOP to the selected transmitter for transmission over the failover link at which point the FOP leaves the node. Referring to the example in FIG. 1, Link B will be used to get the FOP out of Node 0. As mentioned, mux 230, along with selection control logic, acts as an arbitrator and decides when the FOP will have access and get to share the link since normal packets in the buffer for Link B will be using the link as well. In the described embodiment, arbitration is done on a last-won round-robin basis between normal and failover packets.

Note that FIFO A in Node 0 and Node 1 is receiving packets from transmitters (for failed links) and sending packets to transmitters (for alternative links).

Figure 4:
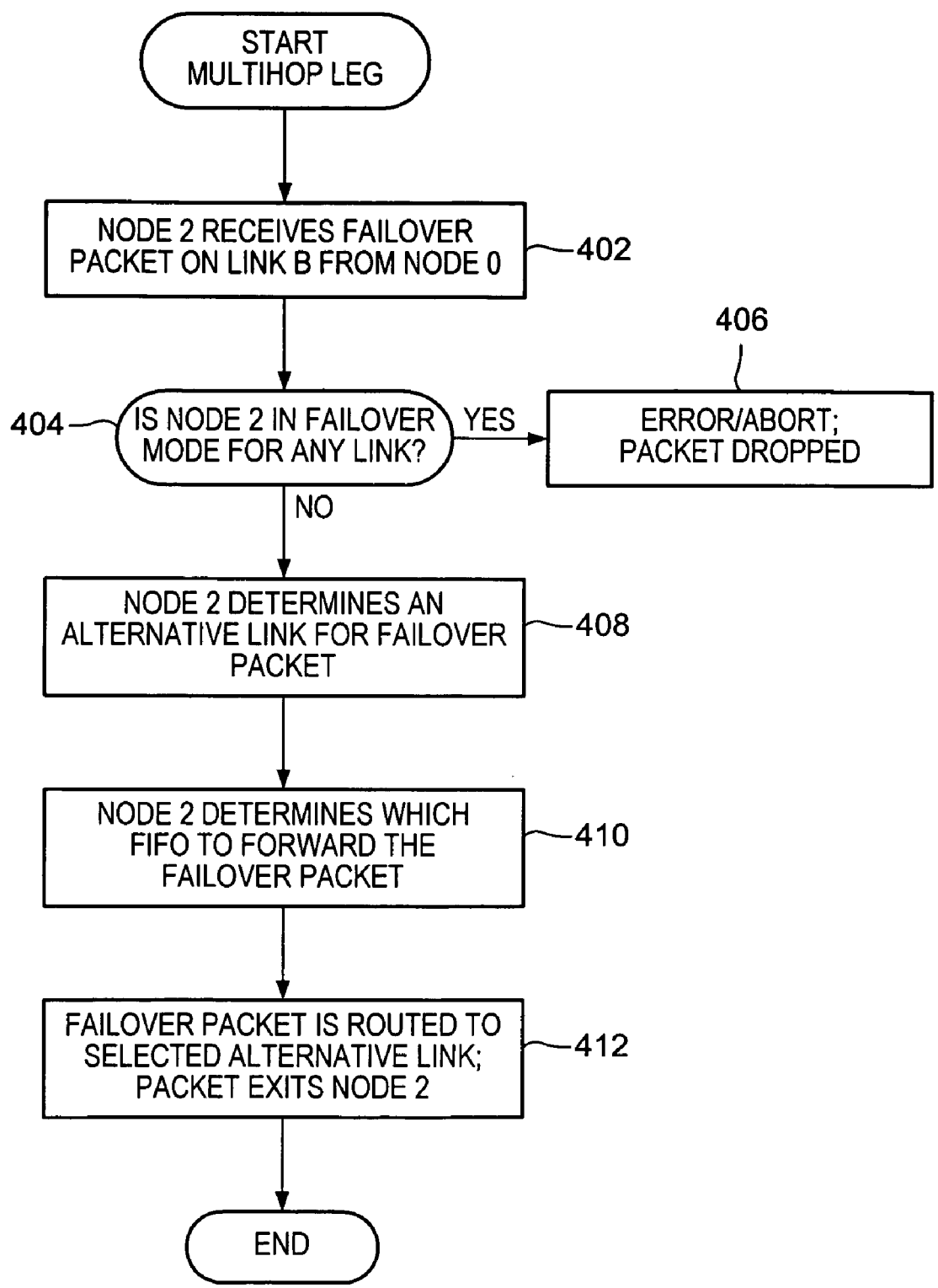
FIG. 4 is a flow diagram of a process for hopping packets in a failover path in accordance with one embodiment of the present invention.

FIG. 4 is a flow diagram of a process for hopping packets in a failover path in accordance with one embodiment of the present invention. A multihop occurs when a node forwards failover traffic. For a node to be a multihop leg the node can not have any of its own links already in failover mode. At step 402 the failover packet is received at the multihop node. In the example, this is Node 2 receiver for Link B. When it reaches the receiver, it goes through the synchronize buffer. When it reaches the head of the sync buffer, receiver logic detects it is a failover packet by checking the failover_pkt bit placed in the packet. If link failover is enabled for forwarding failover packets (i.e., a particular bit, such as failover_en, is set), the packet is sent to the failover logic (essentially, shared resource 224 of FIG. 2) if it contains no detected transmission, framing, or routing errors. No status information is extracted and a multihop failover packet is not modified on a multihop leg (neither packet contents nor its CRC is changed).

At step 404 the node determines whether it is already in failover mode for any of its links. If it is, in the described embodiment, the failover process is finished and an error/abort condition arises and the packet is dropped at step 406. In another preferred embodiment, a full crossbar for failover (as opposed to the two shared failover FIFOs), would allow for simultaneous failover of multiple links. If not, the process continues with step 408 where the node decides which transmitter/link to forward the FOP. As in step 308, the node uses its failover routing tables to make this determination. At this time, the node, such as Node 2 checks whether the target destination for the failover packet (Node 1) is the current node. This can be done by comparing the TNID of the packet to a node_id field in a CSR in the node. If the target node and the current node are the same, the packet has reached its destination leg. A process for handling the packet at a destination node is described in FIG. 5. However, if the target node and the current node are not the same, the processing continues and the packet is routed to the correct outgoing link.

Unlike with the originate leg where the packet was being sent from one Xmit to an alternative Xmit, the packet is not sent directly to FIFO A. In this case, the node determines, using one or more rules, to which FIFO the packet will be sent at step 410. These rules may be set arbitrarily but must be consistently applied. One such possible rule and the one used in the described embodiment is as follows: place the packet in FIFO A if the incoming port number is lower than the outgoing port number and in FIFO B if it is higher. As long as the rules are applied in the same manner for all packets, other values and logic can be used.

Once the packet has made its way through the failover logic and is in one of the FIFOs, the packet is routed to the selected alternative transmitter and sent out on the selected link at step 412. As described in FIG. 3, once the packet reaches the transmitter, it arbitrates for use of the link along with packets that normally use that link. Any appropriate method or rules, such as last-won round-robin, can be used to decide which packet will next use the physical link.

Figure 5:
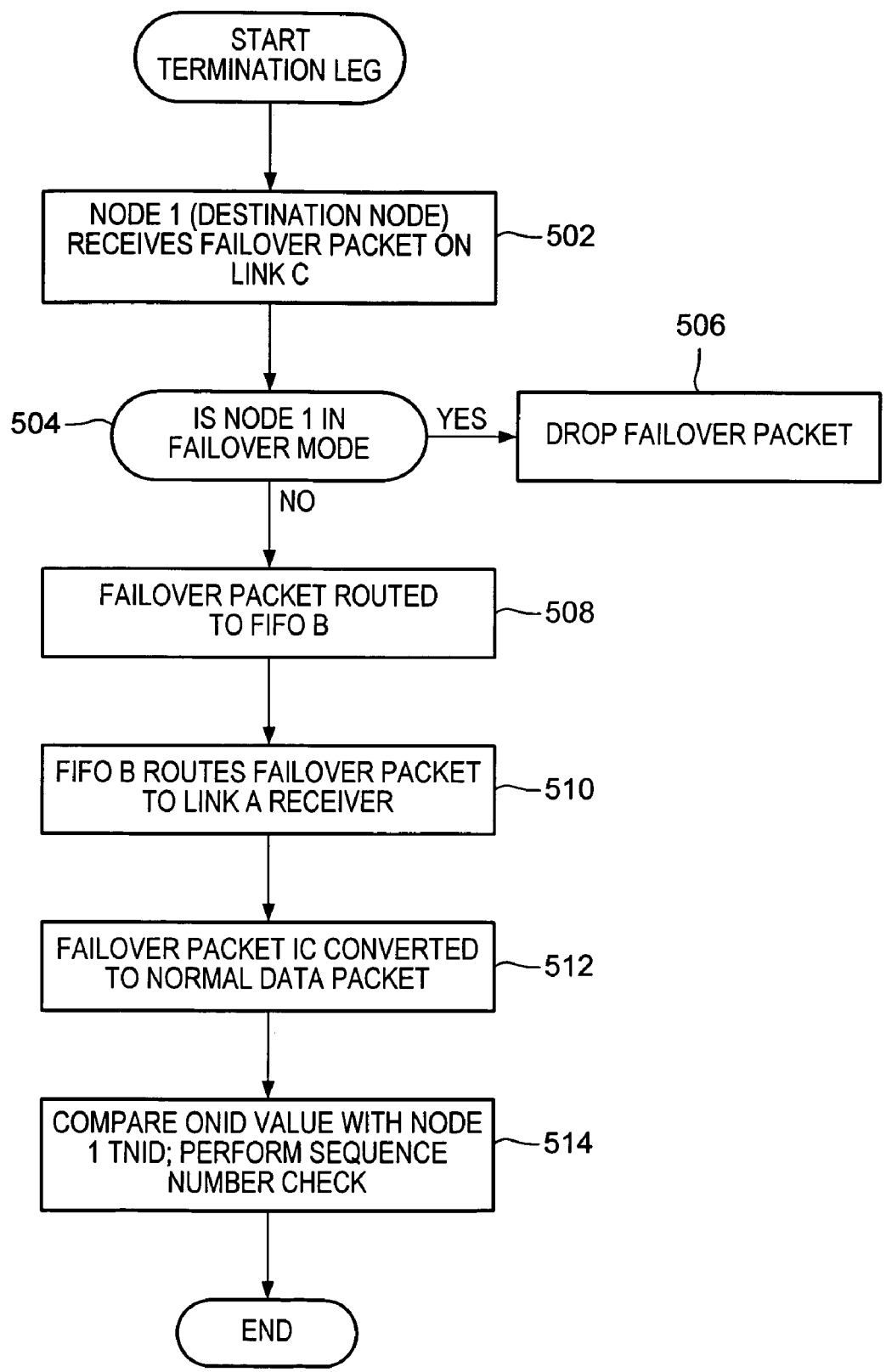
FIG. 5 is a flow diagram of a process of a termination leg of a failover process in accordance with one embodiment of the present invention.

FIG. 5 is a flow diagram of a process of a termination leg of a failover process in accordance with one embodiment of the present invention. At step 502 the terminate node, Node 1, receives the FOP on its Link C receiver and stores it in its failover buffer. For a node to be a termination node for a failover packet, as opposed to a multihop node, the node must be in failover mode. This is determined at step 504. Failover packets will be accepted at the terminate leg node only when the node is in failover mode. In the described embodiment, if the node is not in failover mode, the FOP will be dropped at step 506 if the packet is destined to this node. If it is in failover mode, control goes to step 508.

At step 508 the FOP is routed to FIFO B from the failover buffer. As mentioned above, FIFO B only receives input from receivers. At step 510, when the packet arrives at the head of FIFO B, it is sent to the receiver for failed Link A, the interconnect that had originally failed. At step 512 the FOP is converted by resetting the failover_pkt bit in the packet. In the described embodiment, if the receiver is already in failover mode, it expects to receive failover packets (and not normal packets) which has proper CRC values and sequence numbers. At this stage the packet is processed as if it were received from the sync buffer. At step 514 the original ONID value in the CRC is checked with the node's TNID and sequence number. Packets failing the CRC check are dropped and treated as transmission errors. Those passing are placed in the appropriate buffer.

Figure 6:
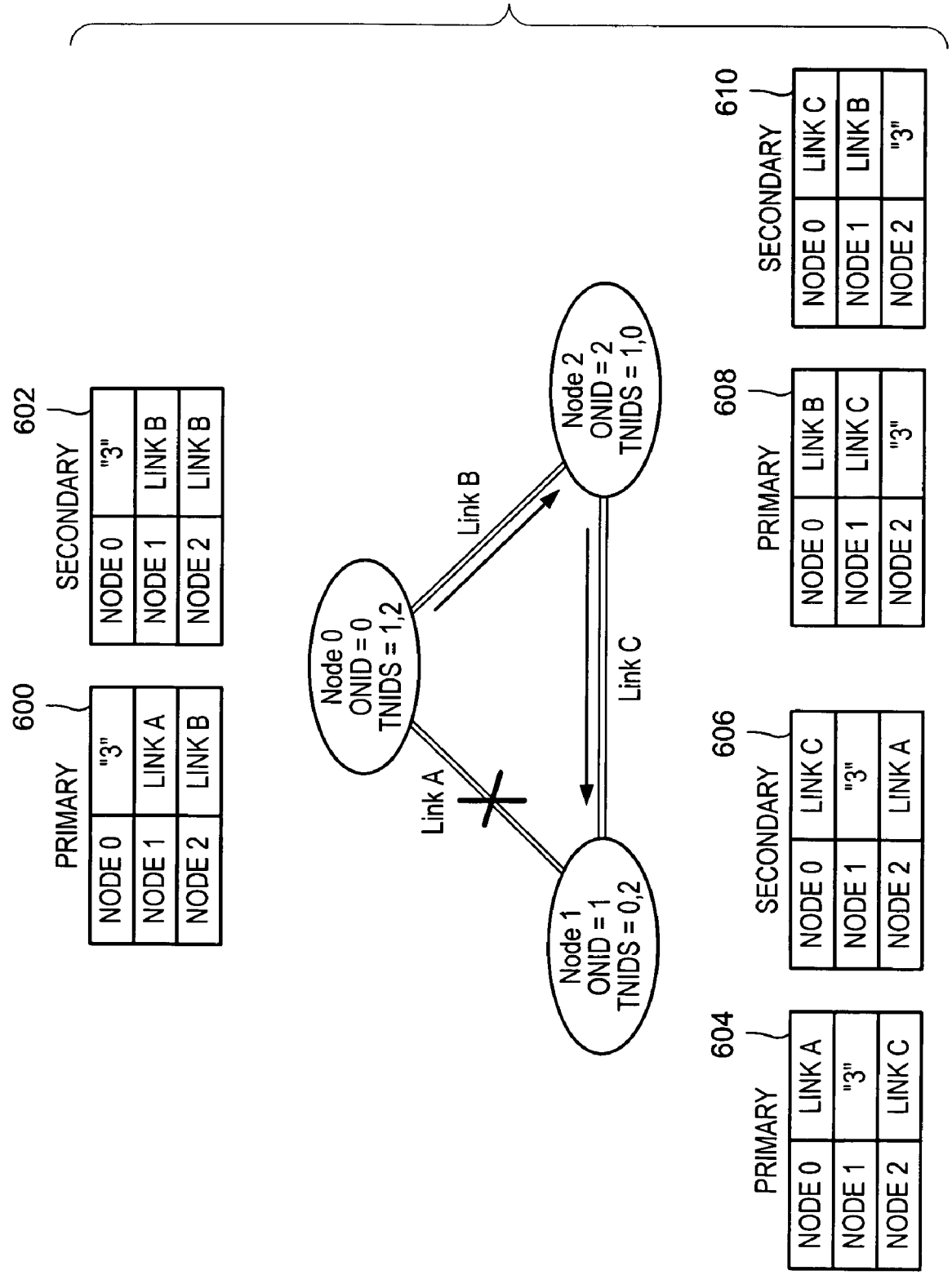
FIG. 6 shows the structure of failover route tables in accordance with one embodiment of the present invention.

FIG. 6 shows the structure of failover route tables in accordance with one embodiment of the present invention. Each node has a primary and secondary route table. Each table is made up of n rows and two columns, where n is the number of nodes in the network (or a realm of the network). Referring to the above example, the failover route tables for Nodes 0, 1, and 2 are shown. Table 600 is the primary table and table 602 is the secondary table for Node 0, table 604 and 606 are the primary and secondary routing tables for Node 1, and table 608 and table 610 are the primary and secondary routing tables for Node 2. In the described embodiment, the first column in any of the tables contains TNIDs of all the nodes. The TNID of an incoming FOP is used to index this table In the example, there is a total of three entries for three nodes in this column, including an entry for the current node. In the primary table, the second column contains the primary or "first choice" link to be used for a corresponding node. For example, for sending a packet to Node 0 from Node 1, Node 1's primary routing table instructs that for Node 0, Link A should be used. Similarly, Node 0's primary route table indicates that Link A should be used for sending data to Node 1. For sending data to Node 2, Link B should be used. The entry for the current node itself contains a specially designated value that means "local" or "no route." Such a value indicates that the local node is the target node for that FOP, or that there is no route to the destination node from the current node.

Secondary table 602, for example, is used if the link indicated in the primary route table is a failed link. Thus, originally when Node 0 was going to send a packet to Node 1, the primary route table indicated that it should use Link A. Since Link A had failed, Node 0 checked its secondary route table and determined that the alternative link to get the packet to Node 1 is Link B which gets the packet to Node 2 first (although the fact that it is using Node 2 is irrelevant to Node 0). Once at Node 2, its routing tables are used in the same manner. Since Link C had not failed, it did not need to search its secondary table. This is done for as many multihop nodes as needed to ensure that the packet reaches its originally intended termination node. Regardless of how the failover routing is configured (a failover path can have any number of hops) there will always be a case where the primary route table will point to the link on which the packet arrives for at least one failing link case.

Figure 7:
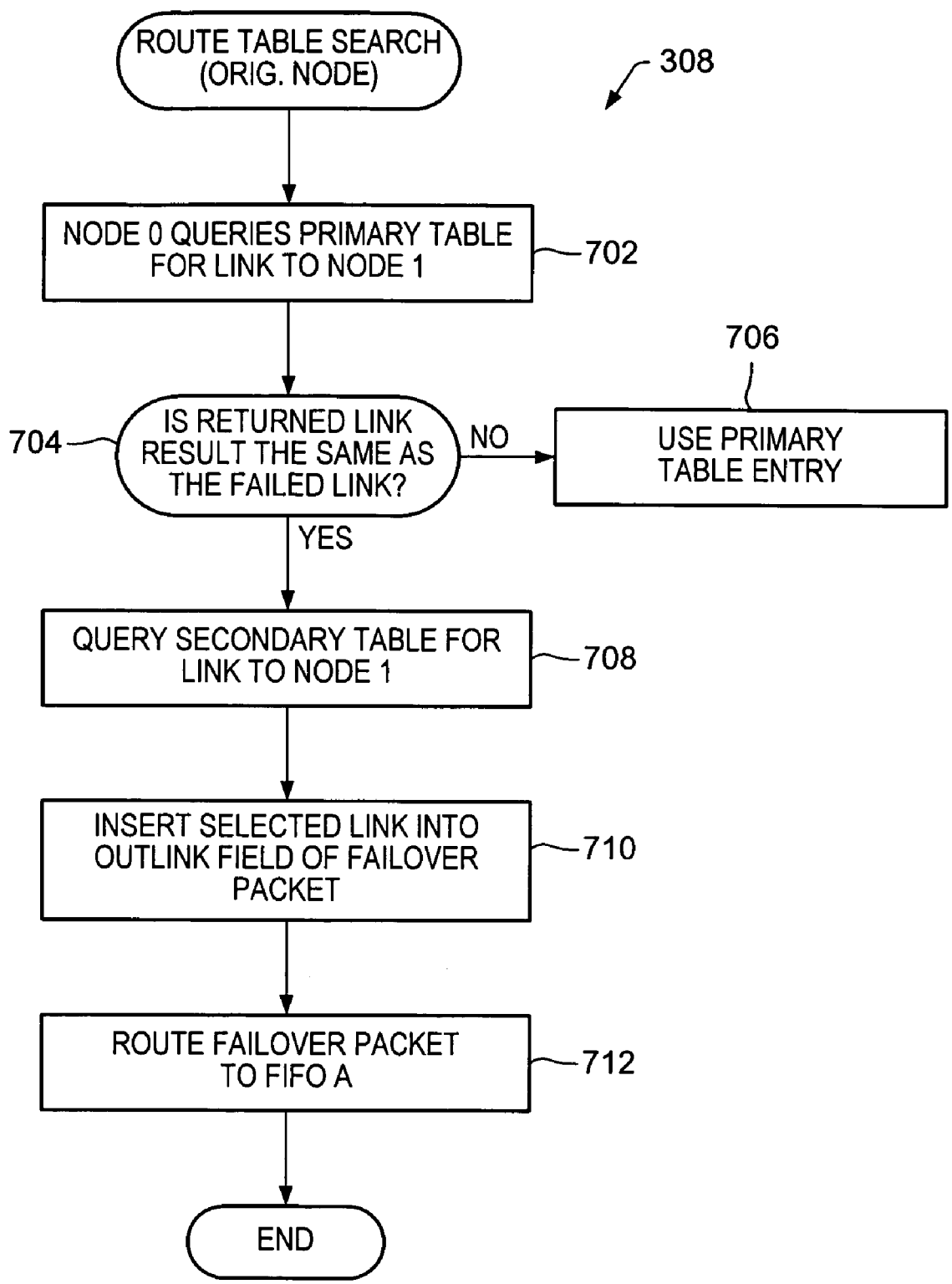
FIG. 7 is a flow diagram of a process of checking the failover routing tables at the originating node when an interconnect link has failed in accordance with one embodiment of the present invention.

FIG. 7 is a flow diagram of a process of checking the failover routing tables at the originating node when an interconnect link has failed in accordance with one embodiment of the present invention. It describes in greater detail step 308 of FIG. 3B. At step 702 Node 0 queries its primary routing table for sending the packet to Node 1. At step 704 the returned result, Link A, is compared to the failed link. If the two are not the same, control goes to step 706 where the returned link is used and is inserted into the outlink field of the data packet and the normal routing process is used. If the returned link is the same as the failed link, control goes to step 708 where the secondary routing table is queried for Node 1. At step 710 the returned result is inserted into the outlink field of the FOP. The packet is then routed to FIFO A at step 710 and the process continues with step 310 of FIG. 3B.

Figure 8:
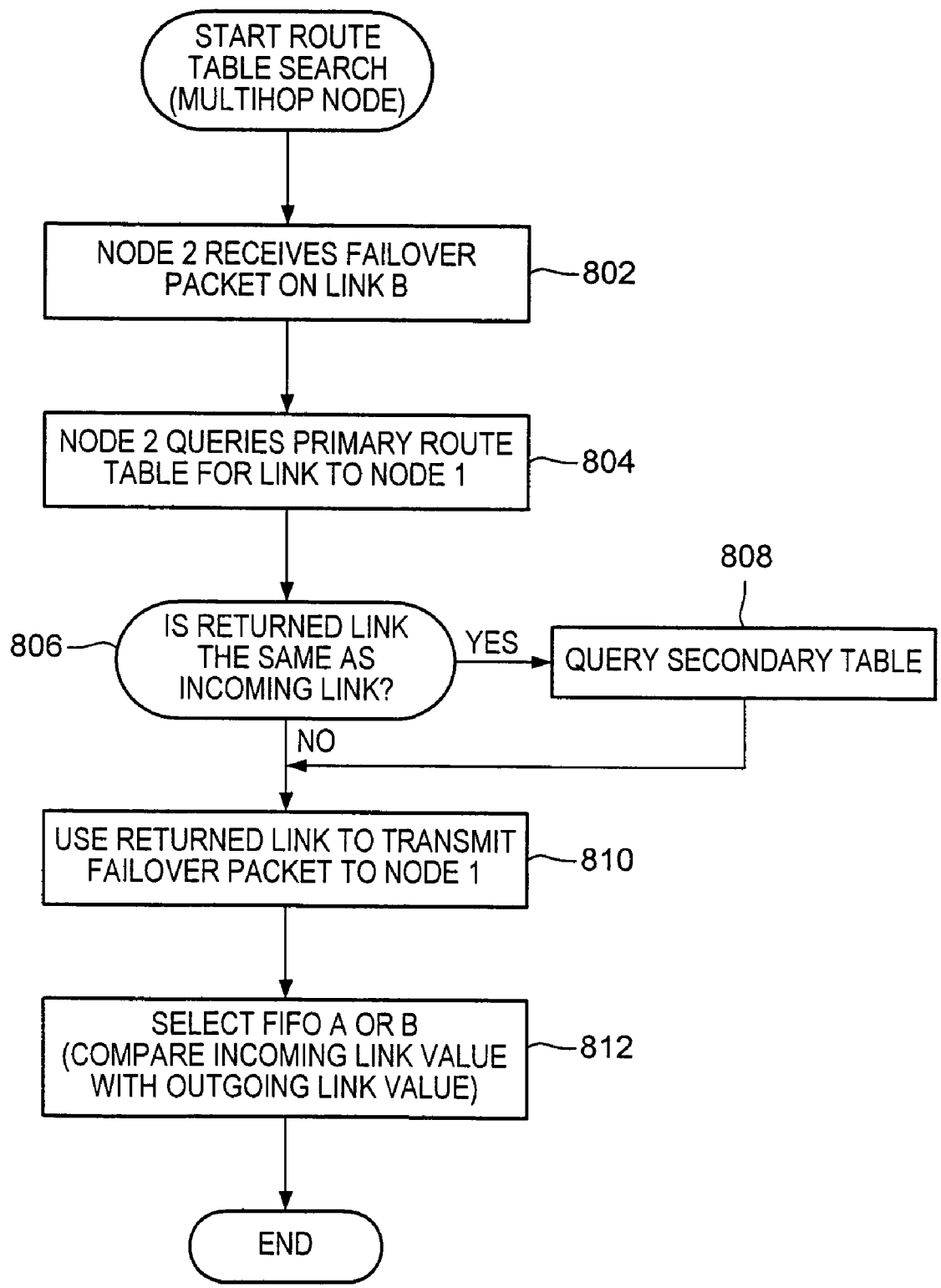
FIG. 8 is a flow diagram of a process of checking the failover routing tables at a multihop node when an interconnect link has failed in accordance with one embodiment of the present invention.

FIG. 8 is a flow diagram of a process of checking the failover routing tables at a multihop node when an interconnect link has failed in accordance with one embodiment of the present invention. It describes in greater detail steps 408 and 410 of FIG. 4 where the node determines on which alternative link to forward the FOP and which FIFO to use. At step 802 Node 2, the multihop node in the above illustration, receives an FOP on Link B. At step 804, Node 2 checks its primary routing table using the TNID for Node 1 as an index. In the case of a multihop node which does not have any failed links, the secondary routing table will be searched if the primary table returns the incoming link. In this case, Link C would be returned. This check is done at step 806 where the returned link from the primary table is compared to the link on which the FOP arrived. In this case Link B, the incoming link, is compared to Link C. If the two are the same, control goes to step 808 where the secondary routing table is searched again using the TNID for Node 1 as an index.

Once an outgoing link has been determined whether from the primary or secondary table, that link is used to forward the FOP. In this case Link C will be used to send the packet to its destination. Before the packet can be sent out, it will first make its way through the failover logic and get to the appropriate transmitter. At step 812 the node determines which FIFO to use. In the case of a multihop node, where a packet is routed internally from a receiver to a transmitter, either FIFO A or B can be used to route the FOP. In the described embodiment, the node chooses a FIFO by comparing physical port numbers or identifiers of the incoming and outgoing links. For example, if the port number for Link B is greater than the port number for Link C, then the FOP is routed to FIFO A, if not, it is routed to FIFO B. The reverse of this rule can also be used, as long as the rule is applied consistently for all FOPs. Once the packet goes through one of the FIFOs, it is sent to the appropriate transmitter for the selected outgoing link at step 814 and is transmitted to its destination node (or to another multihop node).

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although the primary and secondary tables are shown as two separate relational tables, all information can be stored in a single table or in another viable type of data structure such as a flat file. In another example, more FIFO data stacks can be used in the shared resource to process and route failover data packets. Accordingly, the present embodiments are to be considered as illustrative and not restrictive, and the invention is not to be limited to the details given herein, but may be modified within the scope and equivalents of the appended claims.

What is claimed is:

1. A method of twitting data over a network having a plurality of nodes and links when a link has failed, the method comprising:

receiving a data packet at a first node having a failed link, the data packet scheduled to use the failed link;

converting the data packet to a failover data packet at the first node by marketing the data packet as a failover pact and recomputing a CRC value;

routing the data packet to a failover storage area;

determining an alternative link for the data packet and muting the data packet to a transmitter associated with the alternative link; and transmitting the data packet to a receiver for the alternative link in a second node, thereby allowing the data packet to reach an intended destination by effecting the first node at a hardware level and without software intervention.

2. A method as recited in claim 1 further comprising:
detecting a specific link failure at the first node; and
switching the first node to failover mode for the specific link.

3. A method as recited in claim 2 further comprising:
notifying a third node at the far-end of the specific link of the failure; and
switching the third node to failover node for the specific link.

4. A method as recited in claim 1 further comprising examining one or more failover route tables using a destination node identifier as an index and retrieving the alternative link.

5. A method as recited in claim 4 further comprising querying a primary route table using the destination node identifier to retrieve a primary link.

6. A method as recited in claim 5 further comprising querying a secondary route table to retrieve the alternative link if the primary link is a failed link.

7. A node in a communication network comprising:

a receiver including a failover buffer for routing a failover data packet;

a first-in, first-out (FIFO) data storage area for storing the failover data packet and routing the data packet to a receiver or a transmitter; and a failover routing table including at least two rows, a row corresponding to a neighboring node, and one or more interconnect links, wherein the node is configured to detect a failure in a link connected to the node, wherein if a data packet at the node is scheduled to use the failed link, the failover route tables are configured to determine an alternative link to transmit the data packet to not disrupt the transmission of the data packet;

wherein the FIFO data storage area includes a first FIFO data stack, a second FIFO data stack, and a plurality of multiplexers.

8. A node as recited in claim 7 wherein the receiver further comprises a multiplexer for routing the failover data packet to the failover buffer.

9. A node as recited in claim 7 wherein the first FIFO data stack outputs data to a transmitter and accepts input data from a receiver and a transmitter and the second FIFO data stack outputs data to a transmitter and a receiver and accepts input data from a receiver.

10. A node as recited in claim 7 wherein the failover routing table further comprises a first column for storing a node identifier and a second column for storing a transmitter identifier.

11. A node as recited in claim 7 further comprising a transmitter having an arbitrator for determining whether a normal data packet or a failover data packet will be transmitted on a link.

12. A node as recited in claim 11 wherein the arbitrator is a multiplexer and selection control logic.

13. A method of transmitting data over a network having a plurality of nodes and links when a link has failed, the method comprising:
receiving a data packet at a first node having a failed link, the data packet scheduled to use the failed link;
storing the data packet in a failover buffer when received at the first node and before routing the data packet to a failover storage area;
routing the data packet to the failover storage area;
determining an alternative link for the data packet and routing the data packet to a transmitter associated with the alternative link; and
transmitting the data packet to a receiver for the alternative link in a second node, thereby allowing the data packet to reach an intended destination by effecting the first node at a hardware level and without software intervention.

14. A method of transmitting data over a network having a plurality of nodes and links when a link has failed, the method comprising:
receiving a data packet at a first node having a failed link, the data packet scheduled to use the failed link;
routing the data packet to a failover storage area, wherein said routing the data packet to the failover storage area further comprises routing the data packet to a first data stack or a second data stack;
determining an alternative link for the data packet and routing the data packet to a transmitter associated with the alternative link; and
transmitting the data packet to a receiver for the alternative link in a second node, thereby allowing the data packet to reach an intended destination by effecting the first node at a hardware level and without software intervention.

15. A method as recited in claim 14 further comprising determining whether the data packet is routed to the first data stack or to the second data stack.

16. A method as recited in claim 14 wherein the first data stack receives data packets from receivers and transmitters and the second data stack receives data packets from receivers only.

17. A method as recited in claim 14 further comprising forwarding the data packet form the failover storage area to the selected transmitter for the alternative link.

18. A method as recited in claim 14 further comprising sending out the data packet from the selected transmitter without storing the data packet in a buffer for the selected transmitter.

19. A method of transmitting data over a network having a plurality of nodes and links when a link has failed, the method comprising:
receiving a data packet at a first node having a failed link, the data packet scheduled to use the failed link;
routing the data packet to a failover storage area;
determining an alternative link for the data packet and routing the data packet to a transmitter associated with the alternative link;
transmitting the data packet to a receiver for the alternative link in a second node, thereby allowing the data packet to reach a intended destination by effecting the first node at a hardware level and without software intervention; and
sharing only the alternative link at the first node in order to transmit the data packet to the second node.

20. A method of transmitting data over a network having a plurality of nodes and links when a link has failed, the method comprising:
receiving a data packet at a first node having a failed link, the data packet scheduled to use the failed link;
routing the data packet to a failover storage area;
determining an alternative link for the data packet and routing the data packet to a transmitter associated with the alternative link;
transmitting the data packet to a receiver for the alternative link in a second node, thereby allowing the data packet to reach an intended destination by effecting the first node at a hardware level and without software intervention; and
determining whether the second node is in failover mode after the second node receives the data packet from the first node on the alternative link.

21. A method of transmitting data over a network having a plurality of nodes and links when a link has failed, the method comprising:
detecting a failed link coupled to a first node, wherein the first node comprises a data packet scheduled to be transmitted via the failed link;
in response to detecting the failed link, converting the data packet to a failover data packet at the first node by marking the data packet as a failover packet and recomputing a CRC value;
routing the data packet to a failover storage area;
determining an alternative link for the data packet and routing the data packet to a transmitter associated with the alternative link; and
transmitting the data packet to a receiver in a second node coupled to the alternative link.

22. A system having a plurality of nodes and links, wherein the plurality of nodes are configured to communicate with one another via the plurality of links, the system comprising:
a first node coupled to a plurality of links, wherein the first node is configured to detect a failure in a first link, wherein the first node comprises:
a receiver configured to receive a data packet scheduled to be transmitted via the first link, wherein the data packet is converted to a failover data packet in response to detecting the failure in the first link by making the data packet as a failover packet and recomputing a CRC value,
one or more failover route tables for determining an alternative link to transmit the data packet by using a destination node identifier as an index, and
a failover storage area for storing the data packet and routing the data packet to a transmitter associated with the alternative link; and
a second node coupled to the alternative link and configured to receive the data packet from the transmitter.

* * * * *

UNITED STATES PATENT AND TRADEMARK OFFICE
CERTIFICATE OF CORRECTION

| | | |
|---|---|---|
| PATENT NO. | : 7,042,837 B1 | Page 1 of 1 |
| APPLICATION NO. | : 09/697663 | |
| DATED | : May 9, 2006 | |
| INVENTOR(S) | : Daniel R. Cassiday and David L. Satterfield | |

It is certified that error appears in the above-identified patent and that said Letters Patent is hereby corrected as shown below:

col. 9, line 63, please change "twitting" to "transmitting".

col. 10, line 2, please change "marketing" to "marking".

col. 10, line 3, please change "pact" to "packet".

col. 10, line 6, please change "muting" to "routing".

Signed and Sealed this

Twenty-second Day of August, 2006

JON W. DUDAS
*Director of the United States Patent and Trademark Office*